(12) United States Patent
Sridharan

(10) Patent No.: US 9,612,914 B1
(45) Date of Patent: Apr. 4, 2017

(54) TECHNIQUES FOR VIRTUALIZATION OF FILE BASED CONTENT

(75) Inventor: Srineet Sridharan, Pune (IN)

(73) Assignee: Veritas Technologies LLC, Mountain View, CA (US)

(*) Notice: Subject to any disclaimer, the term of this patent is extended or adjusted under 35 U.S.C. 154(b) by 408 days.

(21) Appl. No.: 13/555,466

(22) Filed: Jul. 23, 2012

(51) Int. Cl.
  *G06F 12/00* (2006.01)
  *G06F 11/14* (2006.01)
  *G06F 12/109* (2016.01)
  G06F 9/455 (2006.01)
  G06F 17/30 (2006.01)
  G06F 11/32 (2006.01)

(52) U.S. Cl.
  CPC ........ *G06F 11/1456* (2013.01); *G06F 12/109* (2013.01); *G06F 9/45533* (2013.01); *G06F 11/1469* (2013.01); *G06F 11/1471* (2013.01); *G06F 11/323* (2013.01); *G06F 17/30008* (2013.01)

(58) Field of Classification Search
  CPC ............. G06F 11/1456; G06F 11/2074; G06F 12/109; G06F 9/45533; G06F 17/30008; G06F 11/323; G06F 11/1469; G06F 11/1471
  USPC ............ 711/6, 162, 209; 707/684, 685, 686; 714/15, 16
  See application file for complete search history.

(56) References Cited

U.S. PATENT DOCUMENTS

| 7,457,880 | B1* | 11/2008 | Kim .............................. 709/229 |
| 7,937,548 | B2* | 5/2011 | Sampathkumar ............ 711/162 |
| 8,719,540 | B1* | 5/2014 | Miller et al. .................. 711/173 |
| 8,898,114 | B1* | 11/2014 | Feathergill et al. .......... 707/648 |
| 8,904,081 | B1* | 12/2014 | Kulkarni ........................... 711/6 |
| 2008/0307191 | A1* | 12/2008 | Lane et al. .................... 711/209 |
| 2013/0138613 | A1* | 5/2013 | Paulzagade ......... G06F 11/1458 707/647 |
| 2013/0262801 | A1* | 10/2013 | Sancheti et al. .............. 711/162 |

* cited by examiner

*Primary Examiner* — Reginald Bragdon
*Assistant Examiner* — Mehdi Namazi
(74) *Attorney, Agent, or Firm* — Wilmer Cutler Pickering Hale and Dorr LLP

(57) ABSTRACT

Techniques for virtualization of file based content are disclosed. In one particular exemplary embodiment, the techniques may be realized as a method for virtualization of file based content comprising creating, using at least one computer processor, a virtual disk containing metadata associated with one or more files of a backup image. The techniques may include receiving an Input/Output (I/O) request associated with a file of the one or more files of the virtual disk, determining whether the Input/Output (I/O) request is directed towards a virtual disk location containing a portion of the metadata of the virtual disk or a virtual disk location indicating file data of the backup image, sending the Input/Output (I/O) request to the backup image to the virtual disk based on the determination.

20 Claims, 4 Drawing Sheets

TECHNIQUES FOR VIRTUALIZATION OF FILE BASED CONTENT

FIELD OF THE DISCLOSURE

The present disclosure relates generally to virtualization and, more particularly, to techniques for virtualization of file based content.

BACKGROUND OF THE DISCLOSURE

Virtual disks may provide access to file system resources in a more flexible manner. For example, virtual disks may allow an application access to file system resources in a manner that appears like a disk drive to the application. Virtual disks may also allow for cloning systems using virtualized copies of resources. However, virtualization may be required to be based on certain formats such as block based formats (e.g., virtualization of a volume or disk). Virtualization of certain formats such as file based formats may require the files for virtualization to be copied first. This may require additional processing overhead, bandwidth, delay, and storage space.

In view of the foregoing, it may be understood that there may be significant problems and shortcomings associated with current virtualization technologies.

SUMMARY OF THE DISCLOSURE

Techniques for virtualization of file based content are disclosed. In one particular exemplary embodiment, the techniques may be realized as a method for virtualization of file based content comprising creating, using at least one computer processor, a virtual disk containing metadata associated with one or more files of a backup image. The techniques may include receiving an Input/Output (I/O) request associated with a file of the one or more files of the virtual disk, determining whether the Input/Output (I/O) request is directed towards a virtual disk location containing a portion of the metadata or a virtual disk location indicating file data of the backup image, sending the Input/Output (I/O) request to the backup image in the event the Input/Output (I/O) request is directed towards the virtual disk location indicating the file data of the backup image, and sending the Input/Output (I/O) request to the virtual disk in the event the Input/Output (I/O) request is directed towards the virtual disk location containing the portion of the metadata.

In accordance with other aspects of this particular exemplary embodiment, the virtual disk may contain one or more files of the backup image, the files listed with identical sizes to corresponding files on the backup image but having no data other than the metadata.

In accordance with further aspects of this particular exemplary embodiment, the techniques may further include using a filter driver to redirect I/O requests based on the determination of the requested virtual disk location.

In accordance with additional aspects of this particular exemplary embodiment, the virtual disk location requested may comprise an offset.

In accordance with additional aspects of this particular exemplary embodiment, the techniques may further include detecting that the Input/Output (I/O) request is a write request, and sending the Input/Output (I/O) request to a delta file.

In accordance with additional aspects of this particular exemplary embodiment, the techniques may further include further include determining that the Input/Output (I/O) request is for data previously written to the delta file, and sending the Input/Output (I/O) request to the delta file.

In accordance with additional aspects of this particular exemplary embodiment, the techniques may further include saving the delta file to allow subsequent use of changes written to the delta file.

In accordance with additional aspects of this particular exemplary embodiment, the techniques may further include storing a mapping of one or more file block locations.

In accordance with additional aspects of this particular exemplary embodiment, the mapping may store file block locations based on an algorithm including at least one of: most recently used block, least recently used block, most frequently used block, and least frequently used block.

In accordance with additional aspects of this particular exemplary embodiment, file metadata of a virtual disk file may contain a list of one or more volume blocks allocated to the file, and wherein an address of a disk block of the I/O request is mappable to a volume block using the list of one or more volume blocks and the volume block is mappable to a file offset of a file containing it.

In accordance with additional aspects of this particular exemplary embodiment, the mapping may be maintained by a filter driver.

In accordance with additional aspects of this particular exemplary embodiment, the virtual disk may comprise at least one of: a Virtual Machine Disk (VMDK), a Virtual Hard Disk (VHD), and a Virtual Disk Image (VDI).

In accordance with additional aspects of this particular exemplary embodiment, a virtual disk may be based on a backup image and file data copying may be minimized to reduce a time to restore services of a failed system by reducing a time to implement a virtual machine.

In accordance with additional aspects of this particular exemplary embodiment, the metadata of the virtual disk may comprise at least one of: a master boot record and a Global Unique Identifier (GUID) partition table.

In accordance with additional aspects of this particular exemplary embodiment, the virtual disk may comprises at least one of: one or more inodes and one or more master file table (MFT) records.

In accordance with additional aspects of this particular exemplary embodiment, the techniques may be realized as at least one non-transitory processor readable storage medium for storing a computer program of instructions configured to be readable by at least one processor for instructing the at least one processor to execute a computer process for performing the method.

In another particular exemplary embodiment, the techniques may be realized as an article of manufacture for virtualization of file based content. The article of manufacture may comprise at least one non-transitory processor readable medium, and instructions stored on the at least one medium. The instructions may be configured to be readable from the at least one medium by at least one processor and thereby cause the at least one processor to operate so as to create a virtual disk containing metadata associated with one or more files of a backup image, receive an Input/Output (I/O) request associated with a file of the one or more files of the virtual disk, determine whether the Input/Output (I/O) request is directed towards a virtual disk location containing a portion of the metadata or a virtual disk location indicating file data of the backup image, send the Input/Output (I/O) request to the backup image in the event the Input/Output (I/O) request is directed towards the virtual disk location indicating the file data of the backup image, and send the Input/Output (I/O) request to the virtual disk in the event the Input/Output (I/O) request is directed towards the virtual disk location containing the portion of the metadata.

In yet another particular exemplary embodiment, the techniques may be realized as a system for virtualization of file based content comprising one or more processors communicatively coupled to a network. The one or more processors may be configured to create a virtual disk containing metadata associated with one or more files of a backup image, receive an Input/Output (I/O) request associated with a file of the one or more files of the virtual disk, determine whether the Input/Output (I/O) request is directed towards a virtual disk location containing a portion of the metadata or a virtual disk location indicating file data of the backup image, send the Input/Output (I/O) request to the backup image in the event the Input/Output (I/O) request is directed towards the virtual disk location indicating the file data of the backup image, and send the Input/Output (I/O) request to the virtual disk in the event the Input/Output (I/O) request is directed towards the virtual disk location containing the portion of the metadata.

In accordance with additional aspects of this particular exemplary embodiment, the virtual disk may contain one or more files of the backup image, the files may be listed with identical sizes to corresponding files on the backup image but having no data other than metadata.

In accordance with additional aspects of this particular exemplary embodiment, the techniques may further comprise a filter driver configured to redirect I/O requests based on the determination of the requested virtual disk location.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
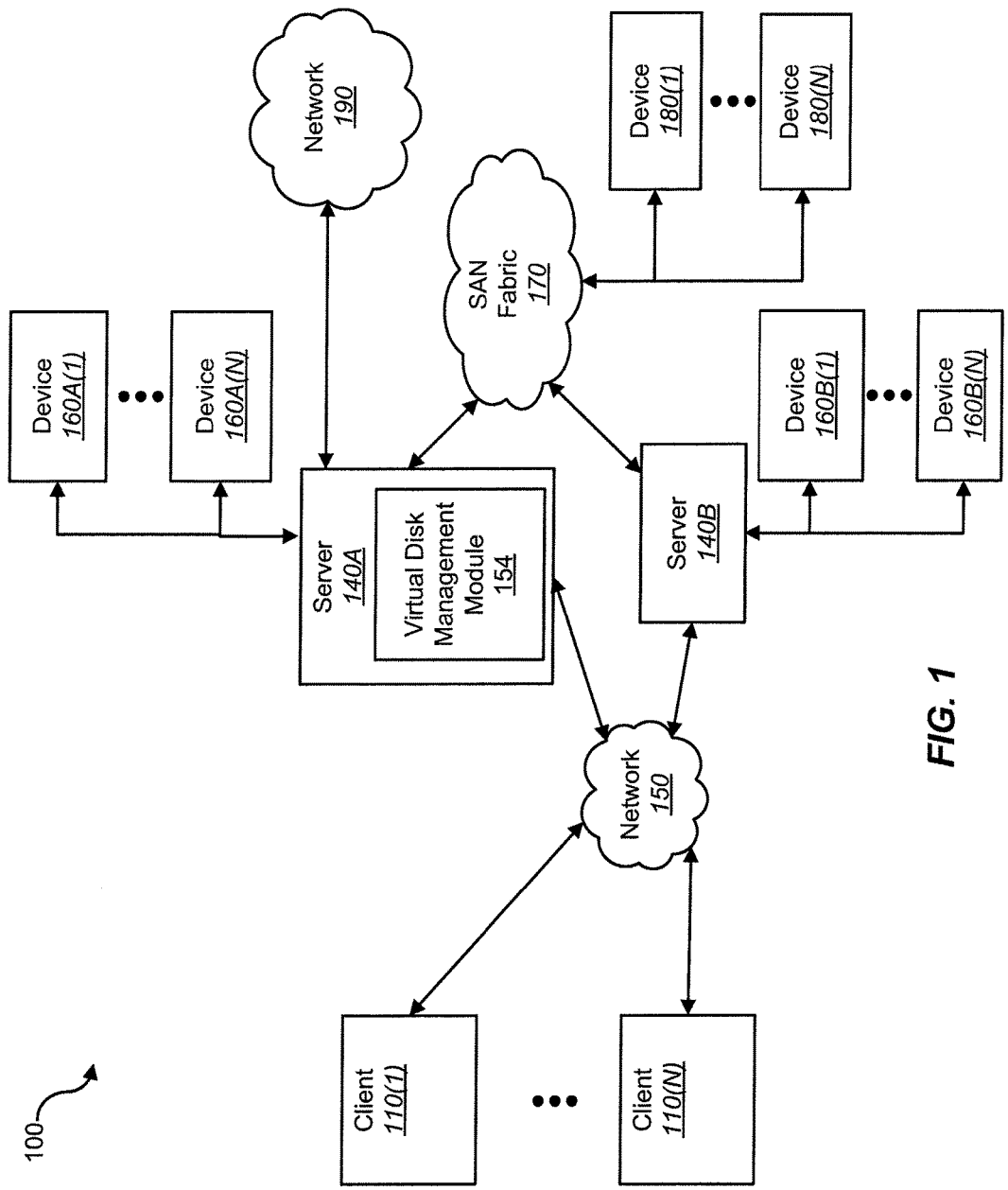
FIG. 1 shows a block diagram depicting a network architecture containing a platform for virtual disk management in accordance with an embodiment of the present disclosure.

FIG. 1 shows a block diagram depicting a network architecture 100 for network bandwidth management in accordance with an embodiment of the present disclosure.

FIG. 1 is a simplified view of network architecture 100, which may include additional elements that are not depicted. Network architecture 100 may contain client systems 110(1)-110(N) as well as servers 140A and 140B (one or more of which may be implemented using computer system 200 shown in FIG. 2). Client systems 110(1)-110(N) may be communicatively coupled to a network 150. Server 140A may be communicatively coupled to storage devices 160A(1)-(N), and server 140B may be communicatively coupled to storage devices 160B(1)-(N). Servers 140A and 140B may be communicatively coupled to a SAN (Storage Area Network) fabric 170. SAN fabric 170 may support access to storage devices 180(1)-(N) by servers 140A and 140B, and by client systems 110(1)-110(N) via network 150. Server 140A may be communicatively coupled to network 190.

The description below describes network elements, computers, and/or components of a system and method for network bandwidth management that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Figure 2:
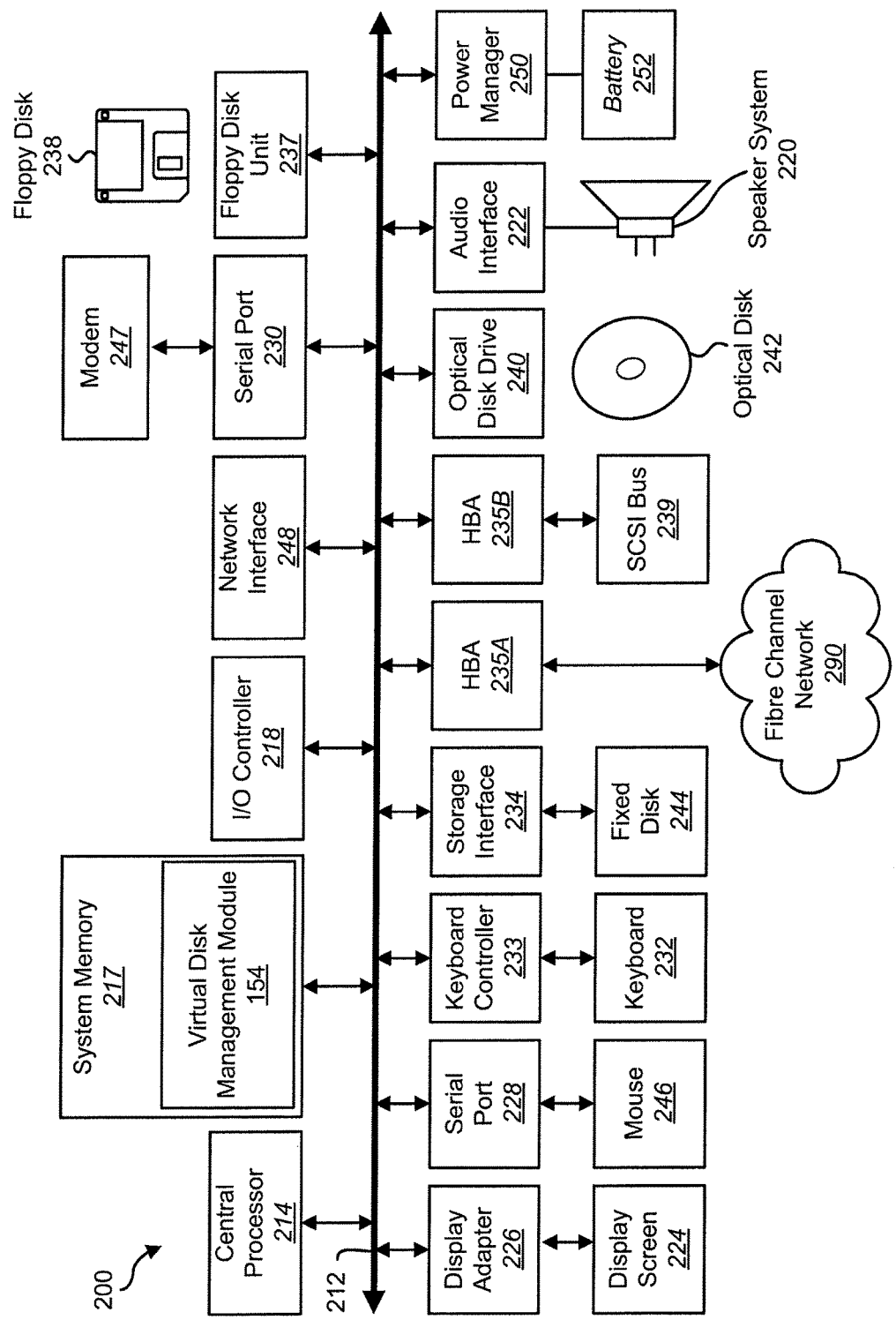
FIG. 2 depicts a block diagram of a computer system in accordance with an embodiment of the present disclosure.

With reference to computer system 200 of FIG. 2, modem 247, network interface 248, or some other method may be used to provide connectivity from one or more of client systems 110(1)-110(N) to network 150. Client systems 110(1)-110(N) may be able to access information on server 140A or 140B using, for example, a web browser or other client software. Such a client may allow client systems 110(1)-110(N) to access data hosted by server 140A or 140B or one of storage devices 160A(1)-(N), 160B(1)-(N), and/or 180(1)-(N).

Networks 150 and 190 may be local area networks (LANs), wide area networks (WANs), the Internet, cellular networks, satellite networks, or other networks that permit communication between client systems 110(1)-110(N), servers 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180(1)-(N) may be network accessible storage and may be local, remote, or a combination thereof to server 140A or 140B. Storage devices 160A(1)-(N), 160B(1)-(N), and/or 180(1)-

(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes.

According to some embodiments, client systems 110(1)-110(N) may be a smartphone, PDA, desktop computer, a laptop computer, a server, another computer, or another device coupled via a wireless or wired connection to network 150. Client systems 110(1)-110(N) may receive data from user input, a database, a file, a web service, and/or an application programming interface.

Servers 140A and 140B may be application servers, archival platforms, backup servers, network storage devices, media servers, email servers, document management platforms, enterprise search servers, or other devices communicatively coupled to network 150. Servers 140A and 140B may utilize one of storage devices 160A(1)-(N), 160B(1)-(N), and/or 180(1)-(N) for the storage of application data, backup data, or other data. Servers 140A and 140B may be hosts, such as an application server, which may process data traveling between client systems 110(1)-110(N) and a backup platform, a backup process, and/or storage. According to some embodiments, servers 140A and 140B may be platforms used for backing up and/or archiving data.

Client systems 110(1)-110(N) may contain virtual disk management module 154. Virtual disk management module 154 may provide virtualization services providing access to backup data. Virtual disk management module 154 may provide virtualization of file based content of one or more backup images that minimizes movement of data required for virtualization of the one or more backup images. Virtual disk management module 154 may create a virtual disk containing metadata of one or more files of a backup image. Metadata may include disk metadata, partition metadata, volume metadata, file system metadata, and/or other metadata. According to some embodiments, a virtual disk may comprise a Virtual Machine Disk (VMDK), a Virtual Hard Disk (VHD), a Virtual Disk Image (VDI), or another disk virtualization format. The virtual disk may appear to have one or more files of a backup image (e.g., all files) and the metadata of the files may be present in the virtual disk (e.g., metadata indicating a file size matching that of the corresponding file in the backup image). However, the data files of the virtual disk may be empty. Thus, a virtual disk may be a skeleton virtual disk holding metadata and empty files whose file sizes match those of corresponding backup image files.

Virtual disk management module 154 may intercept Input/Output (I/O) requests directed to the virtual disk and may redirect Input/Output (I/O) requests based on a request location (e.g., an offset). For example, if an Input/Output (I/O) request is directed to an offset of a file that indicates it is file metadata, the Input/Output (I/O) request may be allowed to proceed to the virtual disk and file metadata may be retrieved from the virtual disk. If the request location indicates that the request is for file data, virtual disk management module 154 may redirect the request to the corresponding offset in the backup image. Thus, virtual disk management module 154 may provide a virtual disk allowing access to file based backups with minimal data copying to generate the virtual disk. According to some embodiments, virtual disk management module 154 contain or interact with a filter driver. The filter driver may be logically above a virtual disk and a backup image but below a layer exposing the virtual disk to a hypervisor (e.g., below a Network File System (NFS)). According to some embodiments, a filter driver may be registered inside a virtual machine corresponding to a virtual disk. In these embodiments, a filter driver may map requests for file data blocks to corresponding file content of a backup image. In one or more of these embodiments, metadata (e.g., disk, partition, volume, and/or file system metadata) may be populated and no mapping may be required to retrieve these blocks. However, a filter driver may detect a request from a virtual machine for a block containing file data and may service the request by mapping a volume block offset to a file offset of the backup image and fetching the corresponding file data from the backup image. According to some embodiments, the virtual disk may contain inodes, master file table (MFT) records, or other data structures which may contain metadata about one or more files on a backup image, but not file data.

A virtual disk may be generated for a variety of types of backup images including, but not limited to, a full backup image, an incremental image, a differential image, and/or a combination of foregoing. A virtual disk may be generated for a specified point in time (e.g., a point prior to a modification or corruption, a latest point in time, etc) and a virtual disk may be synthesized or generated from a corresponding backup or backups. Metadata of a virtual disk may also reflect a backup or backups (e.g., a combination of one or more incremental images and a full image) which correspond to a specified point in time.

Virtual disk management module 154 may provide virtual disks that are read only and/or virtual disks that are writeable. According to some embodiments, virtual disk management module 154 may detect that an Input/Output (I/O) request is a write request and may send the Input/Output (I/O) request to a delta file. A delta file may be a writable file storing changes to a virtual disk. According to some embodiments, a delta file may store data in a virtual disk itself. Thus, a virtualized backup image may appear to be writable but may not modify the content of a backup. Virtual disk management module 154 may determine if an Input/Output (I/O) request is for data previously written to the delta file and may send an Input/Output (I/O) request to the delta file in the event the request is for data previously written to the delta file. Virtual disk management module 154 may store a delta file allowing such changes to be visible to an application or user of a virtual disk upon reboot. According to some embodiments, virtual disk management module 154 may delete a delta file or a delta file may be maintained only in memory and changes to a virtual disk may not be available after a system interruption or a reboot.

According to some embodiments, virtual disk management module 154 may create a virtual disk that may be used for mapping an address of a virtual disk block to a file offset. For example, a virtual disk may comprise a skeleton virtual disk with empty files whose sizes indicate the actual sizes of the corresponding files in a backup image. File metadata in the skeleton virtual disk may contain a list of volume blocks allocated to a file. A request may be directed to a block of a virtual disk. A block of a virtual disk may be mapped to a corresponding volume block number using virtual disk metadata. The volume block number may be mapped to a file offset of a backup image. A file offset may be used to retrieve data from a backup image.

According to some embodiments, mapping may indicate whether data of a virtual disk has been modified (i.e., whether data for one or more blocks should be retrieved from a delta file).

According to some embodiments, virtual disk management module 154 may store a mapping of one or more file block locations (e.g., a hash table, a bitmap etc.). A mapping may facilitate and speed the retrieval of blocks from a virtual disk. According to some embodiments stored mapping information may comprise a file offset. Virtual disk management module 154 may store file block locations in a mapping as they are requested. Virtual disk management module 154 may maintain the mapping based on one more algorithms including at least one of: most recently used block, least recently used block, most frequently used block, and least frequently used block. Block locations may age out of a mapping. According to some embodiments, a virtual disk may contain contiguous extents which may facilitate the mapping of file block locations. Virtual disk management module 154 may use a filter driver to maintain a mapping.

Virtual disk management module 154 may create a virtual disk containing actual data in one or more circumstances. For example, certain types of data may be maintained in a virtual disk itself, including data such as a master boot record and a Global Unique Identifier (GUID) partition table. According to some embodiments, data which may be below a certain size may also be included in a virtual disk. This data may be metadata contained in the virtual disk. For example, some file systems (e.g., NTFS) may permit storage of data for small files directly in a metadata block (e.g., a MFT record).

According to some embodiments, data may be migrated over time into a virtual disk based on one or more factors such as usage of the data, size of the data, user specified preferences, speed requirements, and storage requirements. For example, data that is maintained on a mapping as most frequently used data may be copied to a virtual disk and the mapping may be updated. Such copying may be performed by a background process during off-peak times or periods of low system utilization. Such data may also be removed from a virtual disk based on lower usage statistics, user preferences, or other criteria.

In one or more embodiments, a user may specify which portions of a backup image to virtualize. For example, a user may choose to virtualize only selected files, files meeting one or more specified criteria (e.g., file owner, file type, date range, etc.), or all files of a backup.

A file level virtual disk may permit much quicker restoration in the event of a primary machine failure. A virtual machine may be brought up using a virtual disk based on one or more file based backup images. The instantiation of a virtual machine using such a virtual disk may not need to wait for the copying of data from a backup file. Application services may be brought back in a much more expedient timeframe. Recovery of data from a backup to a primary machine or substitute machine may occur in the background even while a virtual machine using a virtual disk based on the backup is running. New writes may be copied to both a delta file and a restore target location. New writes written to a restore target location may not be overwritten by a restore background copy process. When a restoration is complete a primary machine may be brought up and the virtual machine may be switched off.

FIG. 2 depicts a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 210, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 210 may be stored on and accessed via a computer readable medium, such as a hard disk drive (e.g., fixed disk 244), an optical drive (e.g., optical drive 240), a floppy disk unit 237, or other storage medium. For example, virtual disk management module 154 may be resident in system memory 217.

Storage interface 234, as with the other storage interfaces of computer system 210, can connect to a standard computer readable medium for storage and/or retrieval of information, such as a fixed disk drive 244. Fixed disk drive 244 may be a part of computer system 210 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 210 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
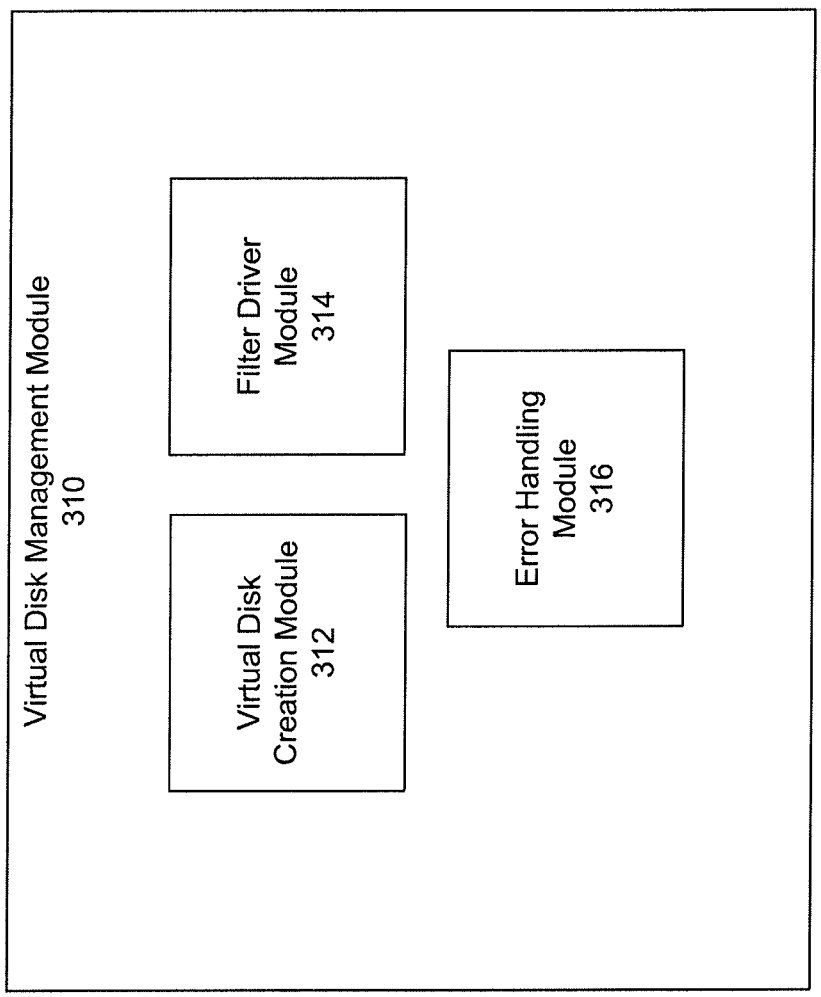
FIG. 3 shows a module for virtual disk management in accordance with an embodiment of the present disclosure.

Referring to FIG. 3, there is shown a virtual disk management module 310 in accordance with an embodiment of the present disclosure. As illustrated, the virtual disk management module 310 may contain one or more components including virtual disk creation module 312, filter driver module 314, and error handling module 316.

Virtual disk creation module 312 may create one or more virtual disks. Virtual disk creation module 312 may provide virtualization file based content of one or more backup images that minimizes movement of data required for virtualization of the one or more backup images. Virtual disk creation module 312 may create a virtual disk containing metadata of one or more files of a backup image. According to some embodiments, a virtual disk may comprise a Virtual Machine Disk (VMDK), a Virtual Hard Disk (VHD), a Virtual Disk Image (VDI), or another disk virtualization format. The virtual disk may appear to have one or more files of a backup image (e.g., all files) and the metadata of the files may be present in the virtual disk (e.g., metadata indicating a file size matching that of the corresponding file in the backup image). However, the data files of the virtual disk may be empty.

According to some embodiments, the virtual disk may contain inodes, master file table (MFT) records, or other data structures which may contain metadata about one or more files on a backup image, but not file data.

Virtual disk creation module 312 may create a virtual disk containing actual data in one or more circumstances. For example, certain types of data may be maintained in a virtual disk itself, including data such as a master boot record and a Global Unique Identifier (GUID) partition table. According to some embodiments, data which may be below a certain size may also be included in a virtual disk.

According to some embodiments, data may be migrated over time into a virtual disk based on one or more factors such as usage of the data, size of the data, user specified preferences, speed requirements, and storage requirements. For example, data that is maintained on a mapping as most frequently used data may be copied to a virtual disk and the mapping may be updated. Such copying may be performed by a background process during off-peak times or periods of low system utilization. Such data may also be removed from a virtual disk based on lower usage statistics, user preferences, or other criteria.

In one or more embodiments, a user may specify which portions of a backup image to virtualize. For example, a user may choose to virtualize only selected files, files meeting one or more specified criteria (e.g., file owner, file type, date range, etc.), or all files of a backup.

Filter driver module 314 may intercept Input/Output (I/O) requests directed to the virtual disk and may redirect Input/Output (I/O) requests based on a request location (e.g., an offset). For example, if an Input/Output (I/O) request is directed to an offset of a file that indicates it is file metadata, the Input/Output (I/O) request may be allowed to proceed to the virtual disk and file metadata may be retrieved from the virtual disk. If the request location indicates that the request is for file data, Filter driver module 314 may redirect the request to the corresponding offset in the backup image. Filter driver module 314 may be logically above a virtual disk and a backup image but below a layer exposing the virtual disk to a hypervisor (e.g., below a Network File System (NFS)).

According to some embodiments, Filter driver module 314 may detect that an Input/Output (I/O) request is a write request and may send the Input/Output (I/O) request to a delta file. A delta file may be a writable file storing changes to a virtual disk. Thus, a virtualized backup image may appear to be writable but may not modify the content of a backup. Filter driver module 314 may determine if an Input/Output (I/O) request is for data previously written to the delta file and may send an Input/Output (I/O) request to the delta file in the event the request is for data previously written to the delta file. Filter driver module 314 may store a delta file allowing such changes to be visible to an application or user of a virtual disk upon reboot. According to some embodiments, filter driver module 314 may delete a delta file or a delta file may be maintained only in memory and changes to a virtual disk may not be available after a system interruption or a reboot.

According to some embodiments, filter driver module 314 may use a virtual disk for mapping an address of a virtual disk block to a file offset. For example, a virtual disk may comprise a skeleton virtual disk with empty files whose sizes indicate the actual sizes of the corresponding files in a backup image. File metadata in the skeleton virtual disk may contain a list of volume blocks allocated to a file. A request may be directed to a block of a virtual disk. A block of a virtual disk may be mapped to a corresponding volume block number using virtual disk metadata. The volume block number may be mapped to a file offset of a backup image. A file offset may be used to retrieve data from a backup image.

According to some embodiments, mapping may indicate whether data of a virtual disk has been modified (i.e., whether data for one or more blocks should be retrieved from a delta file).

According to some embodiments, Filter driver module 314 may store a mapping of one or more file block locations (e.g., a hash table, a bitmap etc.). A mapping may facilitate and speed the retrieval of blocks from a virtual disk. Filter driver module 314 may store file block locations in a mapping as they are requested. Filter driver module 314 may maintain the mapping based on one more algorithms including at least one of: most recently used block, least recently used block, most frequently used block, and least frequently used block. Block locations may age out of a mapping. According to some embodiments, a virtual disk may contain contiguous extents which may facilitate the mapping of file block locations. Virtual disk management module 154 may use a filter driver to maintain a mapping.

Error handling module 320 may handle one or more errors with virtual disk management including, but not limited to, errors with I/O requests, virtualization of backup images, and mapping or indexing of virtual disks.

Figure 4:
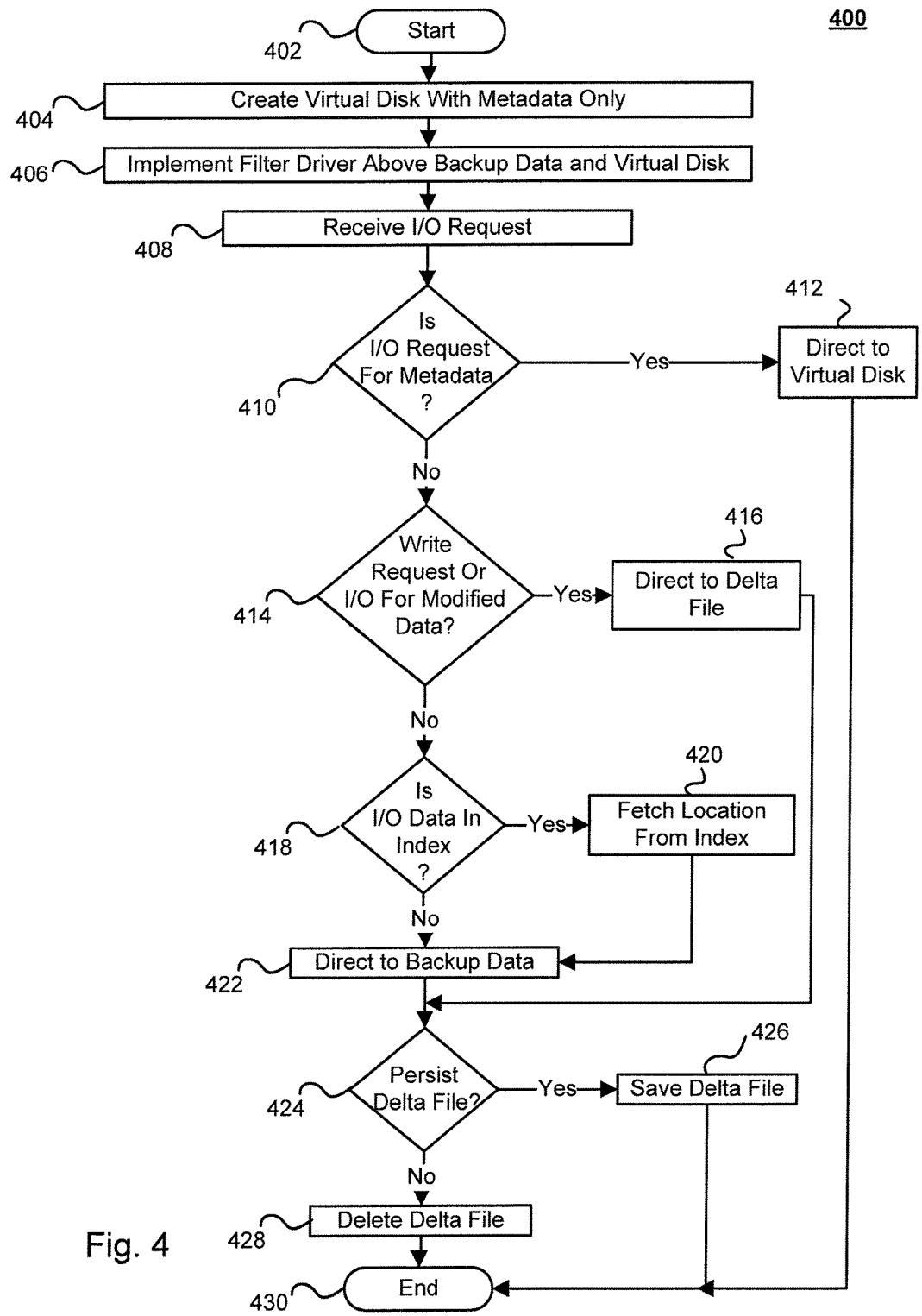
FIG. 4 depicts a method for virtual disk management in accordance with an embodiment of the present disclosure.

Referring to FIG. 4, there is depicted a method 400 for virtual disk management in accordance with an embodiment of the present disclosure. At block 402, the method 400 may begin.

At block 404, a virtual disk may be created.

A virtual disk may provide virtualization of file based content of one or more backup images that minimizes movement of data required for virtualization of one or more backup images. The virtual disk containing metadata of one or more files of a backup image. According to some embodiments, a virtual disk may comprise a Virtual Machine Disk (VMDK), a Virtual Hard Disk (VHD), a Virtual Disk Image (VDI), or another disk virtualization format. The virtual disk may appear to have one or more files of a backup image (e.g., all files) and the metadata of the files may be present in the virtual disk (e.g., metadata indicating a file size matching that of the corresponding file in the backup image). However, the data files of the virtual disk may be empty.

According to some embodiments, the virtual disk may contain inodes, master file table (MFT) records, or other data structures which may contain metadata about one or more files on a backup image, but not file data.

In one or more circumstances a virtual disk containing actual data may be created. For example, certain types of data may be maintained in a virtual disk itself, including data such as a master boot record and a Global Unique Identifier (GUID) partition table. According to some embodiments, data which may be below a certain size may also be included in a virtual disk.

According to some embodiments, data may be migrated over time into a virtual disk based on one or more factors such as usage of the data, size of the data, user specified preferences, speed requirements, and storage requirements. For example, data that is maintained on a mapping as most frequently used data may be copied to a virtual disk and the mapping may be updated. Such copying may be performed by a background process during off-peak times or periods of low system utilization. Such data may also be removed from a virtual disk based on lower usage statistics, user preferences, or other criteria.

In one or more embodiments, a user may specify which portions of a backup image to virtualize. For example, a user may choose to virtualize only selected files, files meeting one or more specified criteria (e.g., file owner, file type, date range, etc.), or all files of a backup.

At block 406, a filter driver may be implemented above backup data to be virtualized and a corresponding virtual disk. A filter driver may be logically above a virtual disk and a backup image but below a layer exposing the virtual disk to a hypervisor (e.g., below a Network File System (NFS)). A filter driver may intercept Input/Output (I/O) requests directed to the virtual disk and may redirect Input/Output (I/O) requests based on a request location (e.g., an offset).

At block 408, an I/O request may be received. It may be determined at block 410 whether the I/O request is for metadata. For example, if an Input/Output (I/O) request is directed to an offset of a file that indicates it is file metadata, the method 400 may continue at block 412. If the request location indicates that the request is for file data, the method 400 may continue at block 414.

According to some embodiments, a virtual disk that may be used for mapping an address of a virtual disk block to a file offset. For example, a virtual disk may comprise a skeleton virtual disk with empty files whose sizes indicate the actual sizes of the corresponding files in a backup image. File metadata in the skeleton virtual disk may contain a list of volume blocks allocated to a file. A request may be directed to a block of a virtual disk. A block of a virtual disk may be mapped to a corresponding volume block number using virtual disk metadata. The volume block number may be mapped to a file offset of a backup image. A file offset may be used to retrieve data from a backup image. At block 412, the Input/Output (I/O) request may be allowed to proceed to the virtual disk and file metadata may be retrieved from the virtual disk.

At block 414, it may be determined whether an I/O request is a write request or an I/O request for previously modified data. If an I/O request is a write request or an I/O request for previously modified data the method 400 may continue at block 416. If an I/O request is not a write request or an I/O request for previously modified data, the method 400 may continue at block 418. According to some embodiments, mapping may indicate whether data of a virtual disk has been modified (i.e., whether data for one or more blocks should be retrieved from a delta file).

At block 416, an I/O request which is a write request or a read request to modified data may be redirected to a delta file. A delta file may be a writable file storing changes to a virtual disk. Thus, a virtualized backup image may appear to be writable but may not modify the content of a backup.

At block 418 it may be determined whether data requested by an I/O is in an index. According to some embodiments, a filter driver or another module may store a mapping of one or more file block locations (e.g., a hash table, a bitmap etc.). A mapping may facilitate and speed the retrieval of blocks from a virtual disk. In some embodiments, file block locations may be stored in a mapping as they are requested. A mapping may be maintained based on one more algorithms including at least one of: most recently used block, least recently used block, most frequently used block, and least frequently used block. Block locations may age out of a mapping. According to some embodiments, a virtual disk may contain contiguous extents which may facilitate the mapping of file block locations. If the requested I/O data is in the index, the method 400 may continue at block 420. If the requested I/O data is not in the index, the method may continue at block 422.

At block 420, an offset for the file location may retrieved from an index.

At block 422, data may be retrieved from a backup file.

At block 424, it may be determined whether a delta file may be persisted. A delta file may be stored or persisted allowing such changes to be visible to an application or user of a virtual disk upon reboot or subsequent to a system interruption. According to some embodiments, a delta file may be deleted or a delta file may be maintained only in memory and changes to a virtual disk may not be available after a system interruption or a reboot. If a delta file is to be persisted, the method 400 may continue at block 426. If a delta file is not to be persisted the method 400 may continue at block 428.

At block 426, a delta file may be saved in response to an indication or a default setting.

At block 428, a delta file may be deleted in response to an indication or a default setting.

At block 430 the method 400 may end.

At this point it should be noted that virtual disk management in accordance with the present disclosure as described above typically involves the processing of input data and the generation of output data to some extent. This input data processing and output data generation may be implemented in hardware or software. For example, specific electronic components may be employed in a virtual disk management module or similar or related circuitry for implementing the functions associated with virtual disk management in accordance with the present disclosure as described above. Alternatively, one or more processors operating in accordance with instructions may implement the functions associated with virtual disk management in accordance with the present disclosure as described above. If such is the case, it is within the scope of the present disclosure that such instructions may be stored on one or more processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for virtualization of file based content comprising:
    creating, using at least one computer processor, a virtual disk containing metadata associated with one or more files of a backup image but not file data associated with the one or more files of the backup image, wherein the virtual disk contains the one or more files of the backup image listed with identical sizes to corresponding files on the backup image but having no data other than the metadata;
    receiving an Input/Output (I/O) request associated with a file of the one or more files of the virtual disk;
    determining whether the I/O request is directed towards a virtual disk location containing a portion of the metadata or a virtual disk location indicating file data of the backup image;
    sending the I/O request to the backup image in the event the I/O request is directed towards the virtual disk location indicating the file data of the backup image; and
    sending the I/O request to the virtual disk in the event the I/O request is directed towards the virtual disk location containing the portion of the metadata.

2. The method of claim 1, wherein if the I/O request is directed towards a virtual disk location indicating file data of the backup image, further comprising determining if the file data requested by the I/O request is in an index.

3. The method of claim 2, wherein file metadata of a virtual disk file contains a list of one or more volume blocks allocated to the file, and wherein an address of a disk block of the I/O request is mappable to a volume block using the list of one or more volume blocks and the volume block is mappable to a file offset of a file containing it.

4. The method of claim 1, further comprising using a filter driver to redirect I/O requests based on the determination of the requested virtual disk location.

5. The method of claim 1, wherein the virtual disk location requested comprises an offset.

6. The method of claim 1, further comprising:
    detecting that the I/O request is a write request; and
    sending the I/O request to a delta file.

7. The method of claim 6, further comprising:
    determining that the I/O request is for data previously written to the delta file; and
    sending the I/O request to the delta file.

8. The method of claim 6, further comprising:
    saving the delta file to allow subsequent use of changes written to the delta file.

9. The method of claim 1, further comprising storing a mapping of one or more file block locations.

10. The method of claim 9, wherein the mapping stores file block locations based on an algorithm including at least one of: most recently used block, least recently used block, most frequently used block, and least frequently used block.

11. The method of claim 9, wherein the mapping is maintained by a filter driver.

12. The method of claim 1, wherein the virtual disk comprises at least one of: a Virtual Machine Disk (VMDK), a Virtual Hard Disk (VHD), and a Virtual Disk Image (VDI).

13. The method of claim 1, wherein the virtual disk is based on the backup image and wherein file data copying is minimized to reduce a time to restore services of a failed system by reducing a time to implement a virtual machine.

14. The method of claim 1, wherein the metadata of the virtual disk comprises at least one of: a master boot record and a Global Unique Identifier (GUID) partition table.

15. The method of claim 1, wherein the virtual disk comprises at least one of: one or more inodes and one or more master file table (MFT) records.

16. At least one non-transitory processor readable storage medium for storing a computer program of instructions configured to be readable by at least one processor for instructing the at least one processor to execute a computer process for performing the method as recited in claim 1.

17. An article of manufacture for virtualization of file based content, the article of manufacture comprising:
    at least one non-transitory processor readable medium; and
    instructions stored on the at least one medium;
    wherein the instructions are configured to be readable from the at least one medium by at least one processor and thereby cause the at least one processor to operate so as to:
        create a virtual disk containing metadata associated with one or more files of a backup image but not file data associated with the one or more files of the backup image, wherein the virtual disk contains the one or more files of the backup image listed with identical sizes to corresponding files on the backup image but having no data other than the metadata;
        receive an Input/Output (I/O) request associated with a file of the one or more files of the virtual disk;
        determine whether the I/O request is directed towards a virtual disk location containing a portion of the metadata or a virtual disk location indicating file data of the backup image;
        send the I/O request to the backup image in the event the I/O request is directed towards the virtual disk location indicating the file data of the backup image; and
        send the I/O request to the virtual disk in the event the I/O request is directed towards the virtual disk location containing the portion of the metadata.

18. A system for virtualization of file based content comprising:
one or more processors communicatively coupled to a network; wherein the one or more processors are configured to:
create a virtual disk containing metadata associated with one or more files of a backup image but not file data associated with the one or more files of the backup image, wherein the virtual disk contains the one or more files of the backup image listed with identical sizes to corresponding files on the backup image but having no data other than the metadata;
receive an Input/Output (I/O) request associated with a file of the one or more files of the virtual disk;
determine whether the I/O request is directed towards a virtual disk location containing a portion of the metadata or a virtual disk location indicating file data of the backup image;
send the I/O request to the backup image in the event the I/O request is directed towards the virtual disk location indicating the file data of the backup image; and
send the I/O request to the virtual disk in the event the I/O request is directed towards the virtual disk location containing the portion of the metadata.

19. The system of claim 18, wherein if the I/O request is directed towards a virtual disk location indicating file data of the backup image, the one or more processors are further configured to determine if the file data requested by the I/O request is in an index.

20. The system of claim 18, further comprising:
a filter driver configured to redirect I/O requests based on the determination of the requested virtual disk location.

* * * * *